Aug. 15, 1961  J. O. CREEK  2,996,281
MOUNTING RING FOR BLADING IN A GAS TURBINE ENGINE
Filed Sept. 5, 1956

INVENTOR
J. O. CREEK
BY: Maybee & Legris
ATTORNEYS

United States Patent Office 2,996,281
Patented Aug. 15, 1961

2,996,281
MOUNTING RING FOR BLADING IN A GAS TURBINE ENGINE
John Oliver Creek, Brampton, Ontario, Canada, assignor to Orenda Engines Limited, Malton, Peel County, Ontario, Canada, a corporation
Filed Sept. 5, 1956, Ser. No. 608,166
1 Claim. (Cl. 253—77)

This invention relates to gas turbine engines and in particular to a mounting ring for the blading in such an engine.

Gas turbine engines of the type generally used in jet aircraft have, during the rapid development undergone in recent years, reached a stage where the temperature and operational speeds of the engine are such that cooled lightweight blades are essential to its efficient operation.

The problem of providing lightweight cooled blades has been solved by the use of hollow sheet metal blades, through which is passed a stream of cooling fluid. The sheet metal construction is lighter in weight than the cast or forged blade and is hollow by nature of its construction thereby avoiding the machining operation which is necessary in solid blades to produce a passage through the blade for the cooling fluid.

Sheet metal blades, however, until the time of the present invention have presented a problem in mounting them on the rotor or stator rings in the engine, since, unlike a solid blade, they cannot be formed with an integral root. A solid root may be formed and secured to the blades but this increases the weight. Further, until the time of this invention the mounting rings for the blading in a gas turbine engine have been solid in construction having spaced milled slots adapted to receive and engage the roots of the blades. This construction is also heavy and adds materially to the weight of the engine.

It is, therefore, an object of the present invention to provide means whereby sheet metal blades may be mounted in a gas turbine engine without the need for heavy solid blade roots and mounting rings.

This object of the invention is attained by the use of a sheet metal mounting ring made in accordance with the present invention wherein such a mounting ring for blading in a gas turbine engine comprises two co-operating annular members adapted to abut one another in coaxial, edge to edge relationship, adjacent edges of the members having a series of notches formed therein, the crests of one series of notches in one member being adapted to seat in the troughs of the other series of notches in the other member, one face of each notch in one member co-operating with the adjacent face of the corresponding notch in the other member to produce therebetween an opening adapted to receive a gas turbine blade.

In the accompanying drawings to which reference is made in the following specification, the features of the invention are illustrated and like reference numerals denote like parts in the various views of which:

Figure 1:
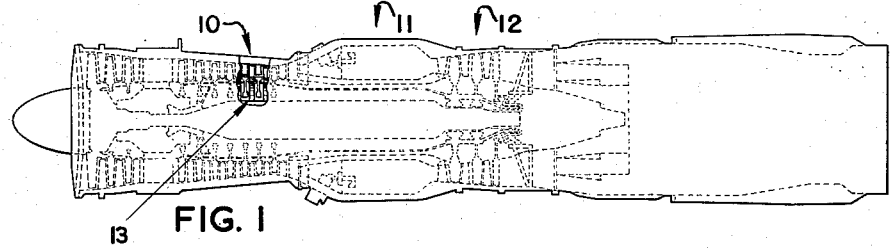
FIGURE 1 is an axial cross-section of a gas turbine engine embodying the invention.

Referring now to the drawings it will be seen that, in FIGURE 1, an axial flow gas turbine engine comprises in general a compressor stage indicated by the reference character 10, a combustion chamber indicated by the reference character 11 and a turbine section indicated by the reference character 12. The compressor section consists of a series of blades one set of which are mounted on a rotor and extend radially outwardly therefrom, the other set being mounted on the stator shell and extend radially inwardly therefrom.

The present invention has to do with a mounting ring for the blading in a gas turbine engine and in FIGURE 1 the mounting ring is indicated in solid lines by the reference character 13.

Referring now to the remaining figures of the drawings the mounting ring will be described in detail.

Figure 2:
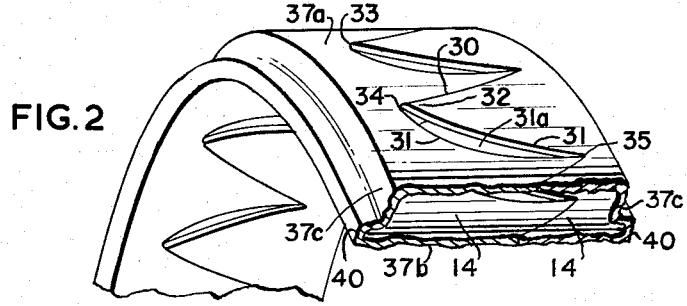
FIGURE 2 is a perspective view of the assembled mounting ring.

It may be seen that the mounting ring for the rotor blading comprises a hollow, annular sheet metal member 37 having a radially outer wall 37a and a radially inner wall 37b and two radially extending side walls 37c. The annular member 37 is a composite structure formed from two pieces 14, each piece 14 comprising two parallel flanges extending axially of the annular member, each having one free edge and being joined to the other flange along the other edge by one of the radially extending side walls 37c. The free edge of each flange of each piece having a series of notches formed therein, the notches in one flange of each piece being radially aligned with the notches of the other flange of the said piece, one face 30 of each notch being straight and the other face 31 being curved as seen in FIGURE 2. Thus, the two pieces 14 may be fitted together with the crests 32 of the notches of one piece seating in the troughs 33 of the notches in the other piece. The straight faces 30 of each notch will abut the straight face 30 of the corresponding notch in the other piece and the two pieces 14 may be secured together by brazing or welding along the line of abutment of the faces 30. The curved faces 31 of each notch will be adjacent the curved faces 31 in the corresponding notches in the other piece. The curved faces 31 in one piece are not, however, identical to the curved faces 31 in the other piece but are so formed that when the pieces are in coaxial, edge to edge relationship, a space 31a will be left between adjacent faces 31 in the two pieces. This space 31a, as can be seen from FIGURE 2, is of a shape similar to the cross-sectional shape of a gas turbine blade and is adapted to receive such a blade. In FIGURE 2 the leading edge of the gas turbine blade will lie at point 34 in space 31a, the trailing edge occupying the point indicated by reference character 35.

Figure 3:
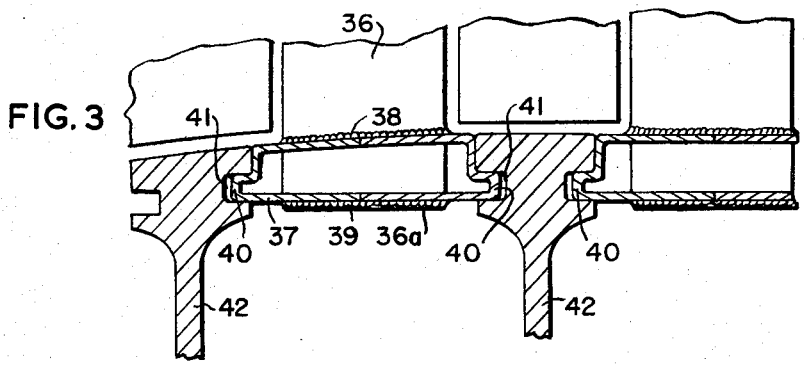
FIGURE 3 is an enlarged view of a portion of the compressor rotor in cross-section.

Referring now to FIGURE 3 it will be seen that the mounting ring of FIGURE 2 is adapted to receive a gas turbine blade 36 with the base of the turbine blade passing through openings 31a both in the upper and lower surface of the completed mounting ring 37. The blade 36 is positioned in the mounting ring 37 so that a short portion of the blade 36, indicated as 36a, extends completely through the mounting ring towards the axis of rotation of the compressor rotor. The turbine blade 36 is brazed to the mounting ring 37 at points 38 and 39 to rigidly secure it thereto. When the mounting ring 37 is ultimately placed in position on the compressor rotor of the gas turbine engine it is possible for material to be removed from the end 36a of the turbine blade to perfectly balance the rotor to eliminate any vibrations which might be set up in the engine at operating speeds if the ring and the associated blades were not perfectly balanced for rotation about an axis.

In FIGURE 3, the method of securing the mounting ring in the engine may be seen. Ribs 40 on the mounting ring are adapted to fit in grooves 41 in rotor discs 42 so as to be positioned against radial and axial displacement.

From the foregoing description it will be observed that a mounting ring has been provided which is of sheet metal construction and, hence, of extremely light weight which can efficiently secure sheet metal turbine blades thereto without materially increasing the combined weight of the blades and the mounting ring. The only additional weight which will be encountered will be that of the brazing material along the points of contact at 38 and 39 in FIGURE 3.

While a specific method of producing the mounting ring has been described and illustrated in this specification, this method and construction is not to be considered as limiting but as illustrative only, the scope of the invention being set out particularly in the appended claim.

What I claim as my invention is:

In a gas turbine engine, a mounting ring for rotor blading adapted to be mounted for rotation about an axis comprising a hollow, annular, sheet metal member having a radially outer wall and a radially inner wall and two radially extending side walls, the annular member being a composite structure formed of two pieces, each piece comprising two parallel flanges extending axially of the annular member and each having a free edge and being joined to the other flange along the other edge by one of said side walls, each flange having a series of notches formed in its free edge, the notches in one flange of each piece being radially aligned with the notches in the other flange of said piece, one face of each notch being straight and the other face being curved, the crests of the notches in both flanges of one piece being adapted to seat in the troughs of the notches in both flanges of the other piece when the pieces are abutted to one another in edge to edge coaxial relationship, the straight faces of opposing notches contacting one another along their entire length and being brazed to one another to join the two pieces together to form the hollow, annular member, the curved faces of opposing notches being so formed that they do not touch one another but define a series of circumferentially spaced openings between opposing curved faces of opposing notches circumferentially spaced about the outer wall and the inner wall of the annular member, each opening in the outer wall being radially aligned with a similarly shaped opening in the inner wall so that a blade may be inserted in each opening in the mounting ring with its spanwise direction lying radially of the mounting ring and in contact with the mounting ring at two points spaced along the length of the blade, one point being the point of contact with the edges of the opening in the outer wall and the other point being the point of contact with the edges of the opening in the inner wall of the annular member.

References Cited in the file of this patent

UNITED STATES PATENTS

| | | |
|---|---|---|
| 1,417,029 | Carlson | May 23, 1922 |
| 2,432,185 | Watson | Dec. 9, 1947 |
| 2,454,580 | Thielemann | Nov. 23, 1948 |
| 2,613,910 | Stalker | Oct. 14, 1952 |
| 2,685,405 | Stalker | Aug. 3, 1954 |
| 2,717,554 | Stalker | Sept. 13, 1955 |
| 2,772,856 | Kent et al. | Dec. 4, 1956 |

FOREIGN PATENTS

| | | |
|---|---|---|
| 853,988 | Germany | Oct. 30, 1952 |